United States Patent [19]

Löbering

[11] 4,119,611
[45] Oct. 10, 1978

[54] PROCESS FOR THE PRODUCTION OF LINEAR CONDENSATES OF PHENOL AND FORMALDEHYDE

[75] Inventor: Joachim Löbering, Grosshesselohe, Fed. Rep. of Germany

[73] Assignee: Zimmer Aktiengesellschaft, Fed. Rep. of Germany

[21] Appl. No.: 845,924

[22] Filed: Oct. 27, 1977

[30] Foreign Application Priority Data

Oct. 30, 1976 [DE] Fed. Rep. of Germany ....... 2650025

[51] Int. Cl.$^2$ ................................................. C08G 8/10
[52] U.S. Cl. ................................. 528/139; 264/176 F; 528/140; 528/129
[58] Field of Search ..................................... 260/57 A

[56] References Cited

U.S. PATENT DOCUMENTS

| 2,809,178 | 10/1957 | Turner et al. ..................... 260/57 A |
| 2,838,473 | 6/1958 | Partansky et al. ................. 260/57 A |
| 3,650,102 | 3/1972 | Economy et al. ............. 260/57 A X |
| 3,716,521 | 2/1973 | Economy et al. ................. 260/59 R |
| 3,723,588 | 3/1973 | Economy et al. ..................... 264/83 |
| 3,876,620 | 4/1975 | Moss ..................................... 260/55 |
| 3,959,433 | 5/1976 | Sauers ................................. 264/328 |

*Primary Examiner*—Howard E. Schain
*Attorney, Agent, or Firm*—Allegretti, Newitt, Witcoff & McAndrews

[57] ABSTRACT

A two-stage process for making a linear condensate of phenol and formaldehyde which can be extruded as a film or thread. In the first stage phenol and formaldehyde are reacted at about 90° C to produce a clear low-viscosity phenol-methylol liquid, the pH of which is adjusted to a value greater than 3, say between 3.5 and 7. In the second stage the product of the first stage is added in aliquot portions to molten phenol having a pH of 3 or less, while maintaining the temperature at about 100° C. After all the phenol-methylol has been added the mixture is slowly heated as the viscosity increases up to about 150° C until there is no further increase in viscosity. The highly viscous end product can be extruded as a film or thread.

7 Claims, No Drawings

PROCESS FOR THE PRODUCTION OF LINEAR CONDENSATES OF PHENOL AND FORMALDEHYDE

This invention refers to a process for the production of linear condensates of phenol and formaldehyde characterized by a high degree of polymerization, high degree of purity and good uniformity. This kind of condensates is specially suitable for the production of coatings, films and threads.

BACKGROUND OF THE INVENTION

Heretofore condensates of phenol and formaldehyde have been produced in such a way that phenol dissolved in water was mixed with formaldehyde and sulphuric acid and this reaction mixture heated. After a certain time more formaldehyde solution was added to the reaction mixture increasing the temperature of the whole batch. After the sulphuric acid was neutralized by means of caustic soda, the water added to the batch, as well as that which had been formed during the chemical reaction, was distilled off under vacuum. This procedure entails difficulties in handling, particularly if applied on an industrial scale. The first phase of the reaction is very turbulent due to the formation of exothermic heat. Further non-homogeneities result when the second portion of formaldehyde is added and later on when the caustic soda is added for the neutralization, for the batch at this time has already separated into layers.

Finally the molten product is washed by adding a quantity of water several times greater than that of the product. Difficulties result from carrying out the washing because the melting point of the condensates is over 100° C. The difficulties mentioned have an influence on the properties of the condensates produced, so that products made from these condensates will be non-homogeneous in their properties. It is further known that in producing condensates of phenol and formaldehyde according to the process described there are upper limits for the degree of polymerization which may be attained. The polymerization limits are due to the nature of the reaction between phenol and formaldehyde. There are two possibilities: first, the formation of linear products with a methylene bridge between the phenolic rings and second, the formation of bridges between linear molecular chains (cross-linking). The second-mentioned reaction leads to insoluble and infusible products which cannot be converted into films or threads. If the mol ratio of phenol to formaldehyde is greater than 1, the first mentioned reaction results. Theoretically a relatively high degree of polycondensation may be attained, if the ratio of phenol to formaldehyde is 1.01. In a particular application with a ratio of phenol to formaldehyde of 1.25 the resulting degree of polymerization was 6 to 7. Polymerization of this order of magnitude is considered not suitable for the production of threads.

THE INVENTION

The invention obviates these problems by providing a practical process for producing, on an industrial scale, phenol-formaldehyde condenates having a high degree of polymerization, a high degree of purity and good homogeneity, suitable for the production of coatings, films and threads. According to the first stage of the invention a phenol-methylol reaction product is produced from phenol and formaldehyde at a pH-value greater than 3. In the second stage this phenol-methylol product is added to a separate additional quantity of phenol which is adjusted to a pH-value lower than 3. The resulting mixture is reacted at progressively increasing temperatures above the melting point of the condensate. The condensate produced is a high-viscosity material and may be extruded in accordance with conventional practice, reduced to chips, ground to powder, washed with water and finally dried. According to this procedure the formaldehyde is bound as methylol to the required phenol during the first stage of the process. The phenol-methylol thus produced is a stable product at temperatures of up to 90° C over long periods of time, is of low viscosity, colorless and clear. In the second stage this product is added progressively in small doses to more phenol.

The pH-value of the first stage, i.e. for the production of phenol-methylol from phenol and formaldehyde is between 3.5 and 7, preferably about 4.5. The pH-value of the phenol which is used in the second stage is preferably adjusted to between 1 and 3.

In the second stage the phenol-methylol is added to the additional phenol in quantities of about 5 to 20 ml/min., preferably in quantities between 8 and 12 ml/min. The addition of the phenol-methylol product to the additional phenol must be accomplished in a period of 30 to 120 minutes, preferably 50 to 80 min. The phenol used in the second reaction stage is heated to a temperature of 90° C before the addition of the phenol-methylol begins. The exothermic reaction of the second stage is maintained at a temperature between 80° and 100° C, preferably at 90° C. In this way the water produced by the reaction will be eliminated almost immediately by evaporation. After completing the addition of phenol-methylol to the phenol during the second stage, the temperature of the reaction mixture is increased slowly corresponding to the increase in melting point of the condensate. With this procedure it is possible to obtain degrees of polymerization in the condensate end product of 10 to 12, resulting in corresponding melting points higher than those of condensates produced heretofore.

The pH-value of the phenol-methylol can be adjusted by adding, e.g. sodium acetate-acetic acid, sodium formate-formic acid or sodium phoshate-phosphoric acid. Further in the first stage salts of an inorganic acid having a cation of the second group of the periodic table (preferably zinc, barium, calcium, magnesium or strontium) are added to the phenol.

The phenol used in the second reaction stage is adjusted in its pH-value by adding the corresponding organic or inorganic acid, namely acetic acid, formic acid or phosphoric acid. Alternatively a salt of an inorganic acid with a cation of the second group of the periodic table, preferably zinc, barium, calcium, magnesium or strontium, may be added.

SPECIFIC EXAMPLE

The invention is illustrated by the following examples.

EXAMPLE 1

In a reactor containing 620 g phenol, 300 g formaldehyde are added while stirring and the reaction mixture is heated up to 90° C. A clear, low viscosity liquid is formed. The pH-value of the reaction mixture is adjusted with sodium acetate-acetic acid to a value of 6 to 7. At the same time 8 g of ZnCl$_2$ are added to the reaction mixture.

In a second reactor 414 g of phenol are melted and maintained at a temperature of 90° C. To the melt 16 ml of a solution of 50% zinc acetate are added as a condensation catalyst and the pH-value of this second batch is adjusted to 3 by means of acetic acid.

To this molten phenol the phenol-methylol produced in the first reactor is added under stirring at a rate of 10 ml/min. A rise in temperature results which is limited by cooling the reactor to a temperature of 98° to 100° C. After about 80% of the phenol-methylol has been added to the molten phenol, the temperature in the reactor drops so that it becomes necessary to heat the reaction mixture in order to maintain the temperature at about 100° C. After all phenol-methylol has been added to the molten phenol, the mixture is slowly heated up to 150° C, at a rate of about 10° C/h. During this period the viscosity of the produced condensate increases slowly. The end of the reaction can be determined by the fact that there is no further increase in viscosity. The condensate, which is a highly viscous material, is extruded to produce chips, which are ground to powder. The powder is washed with water and dried.

The condensate obtained has a melting point of 100° C, a specific viscosity of 1.70 and a degree of polymerization of 10.5.

EXAMPLE 2

In a reactor containing 620 g phenol, 250 g of formaldehyde are added under stirring and the whole reaction mixture heated up to about 90° C. The pH of the batch is adjusted to a value of 6–7 by adding sodium formate-formic acid. At the same time 5 g of CaCl$_2$ are added. Phenol-methylol is formed which contains 1.25 mol formaldehyde per mol of phenol and which remains liquid at a temperature of 15° C and is stable at a temperature of 90° C.

In the second reactor 165 g of phenol are melted and maintained at a temperature of 90° C. To this molten phenol 4 g of CaCl$_2$ are added and the pH-value of this batch adjusted to value of 2.

The phenol-methylol produced in the first stage is added at a rate of 8 ml/min. to the molten phenol. After about 90 min. the addition of phenol-methylol to the phenol is finished. The mol ratio of phenol to formaldehyde in the reaction mixture then amounts about 1 to 1.1–1.08. During the entire period of time of the addition of the phenol-methylol, the reaction mixture is maintained at a temperature of 85° to 90° C by cooling the reaction vessel. After the addition is completed the temperature of the reaction mixture is increased to 120° C in a period of 2 hours to 140° C in 2 more hours and finally up to 160° C.

The condensate thus produced is extruded as a high viscosity material, then ground and the ground material reduced in size to powder. The powder is washed with water and afterwards dried.

The end product has a melting point of 125° C and a degree of polymerization of 11.2.

EXAMPLE 3

The procedure is analogous to the one of Example 2. The only difference is that the pH of the molten phenol of stage 2 is adjusted to between 1 and 2 by means of phosphoric acid.

After the reaction is finished, the condensate melt is transferred by means of compressed air to a vessel containing water, where the melt immediately solidifies. This condensate has a mol ratio phenol to formaldehyde of 1 to 0.909, a PF-No. of 1.1, a degree of polymerization of 11, average molecular weight of 1334 and a specific viscosity of 1.81 measured in glycerine.

This product as a melt can be spun to threads at a temperature of 150° C. The condensate also can be ground and used to produce coating or compression molding compounds. The condensate can also be ground, washed with water, i.e. by means of vacuum cell filters and dried at temperatures below the melting points, preferably under vacuum.

The advantages obtained by this invention are that it makes possible obtaining a condensate of phenol and formaldehyde with a high degree of polymerization, a high degree of purity and a good uniformity by means of a process which can be carried out on an industrial scale and which is practically operable to make a product suitable for the production of coatings, films and threads.

What is claimed is:

1. Process for producing linear phenol formaldehyde condensates characterized by a high degree of polymerization, purity and homogeneity which comprises
    reacting in a first stage reaction phenol and formaldehyde at elevated temperature to produce a phenol-methylol product,
    adjusting the pH of said phenol-methylol product to a value greater than 3,
    adding in a second stage reaction said phenol-methylol product in aliquot portions to an additional quantity of molten phenol having a pH below 3, while maintaining the temperature below about 100° C,
    raising stepwise the temperature of the mixture as the viscosity of the resulting condensate increases until there is no further increase in the viscosity of the condensate, and
    extruding the viscous condensate.

2. The process of claim 1 in which the pH of said phenol-methylol product is adjusted to a value of 4.5.

3. The process of claim 1 in which said molten phenol has a pH of between 1 and 2.

4. The process of claim 1 in which the phenol-methylol product is added within 30–120 minutes.

5. The process of claim 1 in which the molten phenol is preheated to about 90° C.

6. The process of claim 1 in which the first stage condensation is carried out in presence of an inorganic salt having a cation from group II of the periodic table.

7. The process of claim 1 in which the second stage condensation is carried out in presence of an inorganic salt having a cation from group II of the periodic table.

* * * * *